US011210402B2

(12) United States Patent
Cherupalli et al.

(10) Patent No.: US 11,210,402 B2
(45) Date of Patent: Dec. 28, 2021

(54) GATE-LEVEL INFORMATION FLOW SECURITY

(71) Applicants: Regents of the University of Minnesota, Minneapolis, MN (US); University of Illinois at Urbana-Champaign, Urbana, IL (US)

(72) Inventors: Hari Cherupalli, Minneapolis, MN (US); Rakesh Kumar, Urbana, IL (US); John Sartori, Minneapolis, MN (US); Henry Duwe, Urbana, IL (US)

(73) Assignees: Regents of the University of Minnesota, Minneapolis, MN (US); The Board of Trustees of the University of Illinois, Urbana, IL (US)

( * ) Notice: Subject to any disclaimer, the term of this patent is extended or adjusted under 35 U.S.C. 154(b) by 211 days.

(21) Appl. No.: 16/149,748

(22) Filed: Oct. 2, 2018

(65) Prior Publication Data

US 2019/0102563 A1  Apr. 4, 2019

Related U.S. Application Data

(60) Provisional application No. 62/566,878, filed on Oct. 2, 2017.

(51) Int. Cl.
*G06F 21/57* (2013.01)
*G06F 21/55* (2013.01)
*G06F 21/71* (2013.01)

(52) U.S. Cl.
CPC .......... *G06F 21/577* (2013.01); *G06F 21/554* (2013.01); *G06F 21/71* (2013.01); *G06F 2221/033* (2013.01)

(58) Field of Classification Search
CPC ...... G06F 21/577; G06F 21/71; G06F 21/554; G06F 2221/033
See application file for complete search history.

(56) References Cited

U.S. PATENT DOCUMENTS

| 2007/0074003 | A1* | 3/2007 | Yim | G06F 9/328 712/24 |
| 2008/0005619 | A1* | 1/2008 | Arons | G06F 11/3604 714/38.1 |
| 2018/0357344 | A1* | 12/2018 | Cherupalli | G06F 30/33 |

OTHER PUBLICATIONS

Boonstoppel et al., "RWset: Attacking Path Explosion in Constraint-Based Test Generation, In Proceedings of the International Conference on Tools and Algorithms for the Construction and Analysis of Systems", 2008, TACAS 2008, pp. 351-366 (Year: 2008).*
Kuznetsov et al., "Efficient State Merging in Symbolic Execution", 2012, PLDI'12, Jun. 11-16, 2012.*
Davidson et al. "FIE on Firmware: Finding Vulnerabilities in Embedded Systems using Symbolic Execution", 22nd USENIX Security Symposium, Aug. 14-16, 2013.*

(Continued)

*Primary Examiner* — Daniel B Potratz
*Assistant Examiner* — Wansik You
(74) *Attorney, Agent, or Firm* — Dicke, Billig & Czaja, PLLC

(57) ABSTRACT

A method includes receiving a processor design of a processor, receiving an application to be executed by the processor, and receiving a security policy. The method includes simulating the execution of the application on the processor to identify information flow violations generated by the application based on the security policy.

10 Claims, 7 Drawing Sheets

(56) References Cited

OTHER PUBLICATIONS

Tiwari et al., "Crafting a Usable Microkernel, Processor, and I/O System with Strict and Provable Information Flow Security", 2011, ISCA'11, Jun. 4-8, 2011.*

Nobakht et al., "A Host-based Intrusion Detection and Mitigation Framework for Smart Home IoT using OpenFlow", 2016, ARES. (Year: 2016).*

Tiwari et al., Complete Information Flow Tracking from the Gates Up, Department of Computer Science, University of California, Santa Barbara, SIGPLAN Not., vol. 44, Mar. 2009, 12 pages.

Vogt et al., Cross-Site Scripting Prevention with Dynamic Data Tainting and Static Analysis, Secure Systems Lab, Technical University Vienna, University of California, Santa Barbara, NDSS 2007, 12 pages.

Chen et al., Flexible Hardware Acceleration for Instruction-Grain Program Monitoring, International Symposium on Computer Architecture, Jun. 2008, 12 pages.

Venkataramani et al., FlexiTaint: A Programmable Accelerator for Dynamic Taint Propagation, IEEE 14th International Symposium, Feb. 2008, 12 pages.

Chen et al., From Speculation to Security: Practical and Efficient Information Flow Tracking Using Speculative Hardware, 2008 International Symposium, Jun. 2008, 12 pages.

Dalton et al., Raksha: A Flexible Information Flow Architecture for Software Security, 34th Annual International Symposium, 2007, 12 pages.

Xu et al., Taint-enhanced policy enforcement: A practical approach to defeat a wide range of attacks, USENIX Security Symposium, 2006, vol. 15, 16 pages.

Costa et al., Vigilante: End-to-End Containment of Internet Worms, SOSP'05, Oct. 23-26, 2005, 15 pages.

Clause et al., Dytan: A generic dynamic taint analysis framework, ISSTA '07, 2007, 11 pages.

Qin et al., Lift: A low-overhead practical information flow tracking system for detecting security attacks,MICRO 39, IEEE Computer Society, 2006, 12 pages.

Newsome et al., Dynamic taint analysis for automatic detection, analysis, and signature generation of exploits on commodity software, Carnegie Mellon University, 2005, 17 pages.

Tiwari et al., Execution leases: A hardware-supported mechanism for enforcing strong non-interference, 42nd Annual IEEE/ACM International Symposium on Microarchitecture (MICRO), Dec. 2009, 12 pages.

Tiwari et al., Crafting a usable microkernel, processor, and i/o system with strict and provable information flow security, Annual International Symposium on Computer Architecture, ISCA '11, ACM, 2011, 11 pages.

Wang et al., MoLe: Motion leaks through smartwatch sensors, University of Illinois at Urbana-Champaign, https://experts.illinois.edu/en/publications/mole-motion-leaks-through-smartwatch-sensors, May 2, 2019, 3 pages.

Valasek et al., Remote Exploitation of an Unaltered Passenger Vehicle, IOActive, Inc., Aug. 10, 2015, 91 pages.

* cited by examiner

GATE-LEVEL INFORMATION FLOW SECURITY

CROSS REFERENCE TO RELATED APPLICATIONS

This application claims priority to U.S. Provisional Patent Application No. 62/566,878, filed Oct. 2, 2017, entitled "SOFTWARE-BASED GATE-LEVEL INFORMATION FLOW SECURITY FOR IOT SYSTEMS" and is incorporated herein by reference.

BACKGROUND

Wearables, sensors, and the internet of things (IoT) may represent the next frontier of computing. On one hand, they are characterized by extremely low power and cost requirements. On the other hand, they pose a dire security and privacy risk. As the internet of things progresses toward the internet of everything, where nearly everything is connected to the internet via an embedded ultra-low-power processor, higher connectedness implies more security attack vectors and a larger attack surface. Similarly, immersive usage models imply newer, more sinister consequences. The security and privacy concerns are not theoretical either. Reported IoT attacks include compromising baby monitors to enable unauthorized live feeds, interconnected cars to control a car in motion, smartwatches and fitness trackers to steal private information and health data, power grids and steel mills to render them offline, and medical devices with detrimental, perhaps fatal, consequences on patients' health. Consequently, security and privacy should be first order design concerns for IoT systems.

Information-flow security is one approach to providing security and privacy in computer systems. The goal is to track flows of information through a computer system and either detect or prevent illicit information flows between tainted (e.g., untrusted or secure) state and untainted (e.g., trusted or non-secure) state. Tracking and managing flows allows a computer system to support different information flow policies and provide information flow guarantees that security and privacy constructs and protocols can be built upon. An information flow security-based approach can be invaluable in the context of IoT systems due to the above discussed security and privacy risks associated with such systems.

The vast majority of techniques for tracking and managing information flows operate at the level of the (instruction set architecture) ISA or above. While these techniques allow tracking and management of explicit information channels, they are largely incapable of doing the same for implicit or covert channels (including timing channels). Gate-level information flow security approaches have been proposed to allow tracking and management of information flow channels at the finest-grained digital level-gates. These approaches typically augment hardware logic blocks with gate-level information flow tracking (GLIFT) logic to perform information tracking. They also specify a method for performing compositions of augmented logic blocks. A gate-level approach allows tracking of all information flows—implicit, explicit, and covert—allowing one to build secure-by-design systems with varying degrees of programmability and performance Often, the costs of using a gate-level approach are high (e.g., up to 3× in terms of area, 2×-3× in terms of performance, and significant restrictions in terms of programmability depending on the system); this is not surprising, since the goal is to guarantee information flow security for all possible applications. While these costs may be acceptable for high assurance systems (e.g., aviation electronics), they may not be acceptable for many IoT applications. Also, the secure-by-design hardware and accompanying system software derived from gate-level approaches differ dramatically from commodity systems; again, the ultra-low cost requirements of many IoT applications may prohibit wholesale redesign of a system's microcontroller or the accompanying system software.

DETAILED DESCRIPTION

Figure 1:
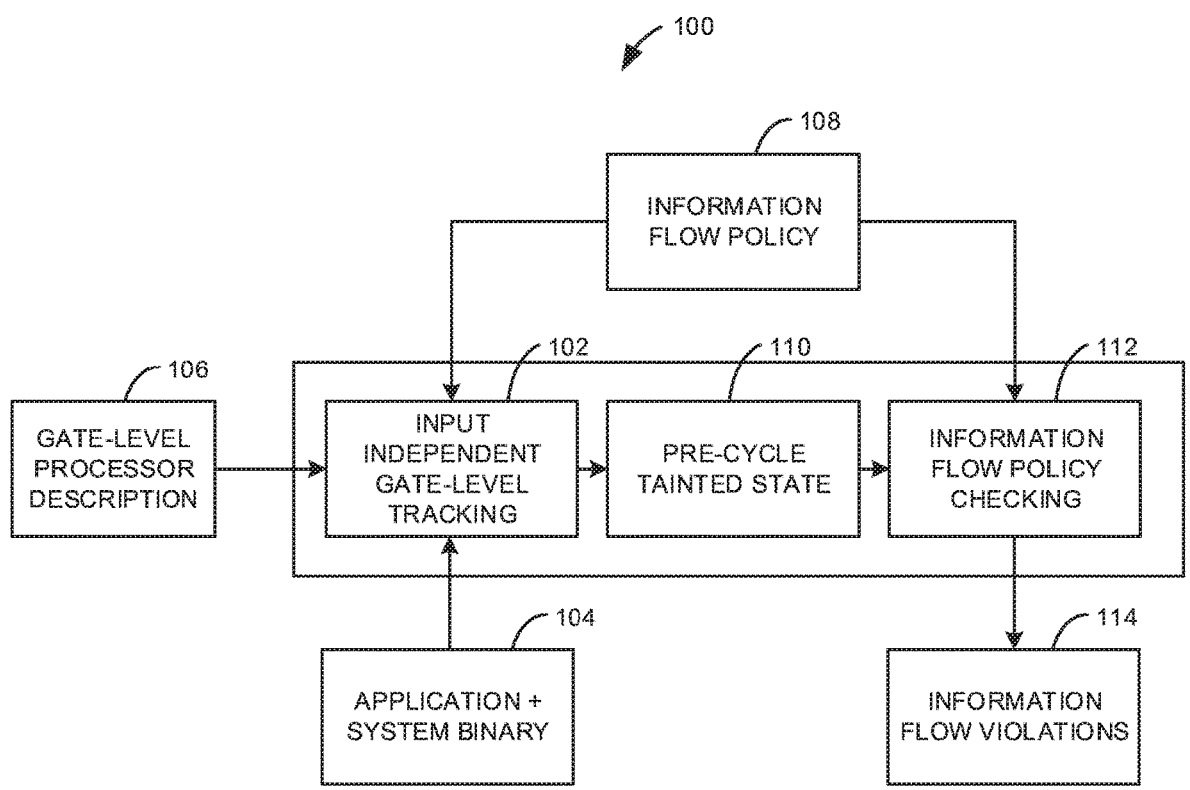
FIG. 1 is a block diagram illustrating one example of application-specific gate-level information flow tracking.

In the following Detailed Description, reference is made to the accompanying drawings which form a part hereof, and in which is shown by way of illustration specific embodiments in which the disclosure may be practiced. It is to be understood that other embodiments may be utilized and structural or logical changes may be made without departing from the scope of the present disclosure. The following detailed description, therefore, is not to be taken in a limiting sense.

It is observed that many of the required architectural and system software changes arise because it is assumed that all software besides the kernel is completely unknown. Since many emerging IoT applications run the same software again and again for the lifetime of the system, there is a unique opportunity to build low-overhead gate-level information flow techniques for these IoT systems. Many IoT systems—consider wearables, implantables, industrial controllers, sensor nodes, etc.—perform the same task (or a small set of tasks) repetitively. However, cost reasons dictate that these systems are implemented using a programmable microcontroller running application software instead of an application-specific integrated circuit (ASIC). It is noted that for such systems, a commodity microcontroller may guarantee gate-level information flow security for a given application, even if a guarantee cannot be provided for all applications. (As used herein, the application is the entire binary code loaded into a system's program memory. This includes all computational tasks as well as all system software.) Similarly, for some applications where gate-level information flow guarantees are not met, it may be possible to guarantee gate-level information flow security through minimal changes to the application software, even if these changes will be inadequate at providing guarantees for all applications (or for other processors). The ability to guarantee gate-level information flow security for the applications of interest on commodity hardware, even if no guarantee is provided for all applications, allows trusted IoT execution without the programmability, performance, and monetary costs of specialized secure-by-design systems derived from previous gate-level approaches.

Accordingly, disclosed herein is a software tool that performs gate-level information flow tracking for a given application on a given processor design without any hardware design effort. As used herein the term "processor" includes any logic circuit that can execute an application. The tool takes as input the processor's gate-level netlist, unmodified application binary, and information flow policies of interest, and performs symbolic (i.e., input-agnostic) gate-level simulation of the application binary on the netlist to determine if any of the information flow policy could be violated. If none of the information flow policies could be violated at the gate-level, the processor is declared to guarantee gate-level information flow security for the application. If an information flow policy could be violated, the tool reports the offending instruction(s). This information can then be used by the programmer or the compiler to modify application software such that gate-level information flow guarantees are met for the application. This analysis can be applied to an arbitrary application and even for a commodity hardware design. Also, unlike previously proposed solutions, the approach can be used selectively for the applications limiting overheads only to certain applications that need software modification.

Information flow security aims to (1) determine if any information flows exist from one state element (e.g., a variable in a program) to another state element and to (2) prevent or warn users of such flows when a flow violates an information flow policy. Prior approaches require hardware modifications and they may still miss information flows that crop up as a result of the low-level implementation details of a processor. The method disclosed herein aims to achieve the advantages of both software-based and hardware-based information flow tracking—applicability to unmodified commodity hardware, accuracy in tracking information flows, and minimal runtime overhead—without the corresponding limitations.

Existing systems have been designed assuming that the application software running on the system is unknown. Since the application is unknown, it is assumed that unknown instructions may read tainted data from all possible sources, propagate tainted data to all parts of the processor, and also write tainted data to all untainted ports and memory regions. I.e., it is assumed that an unknown application has the potential to cause all possible information flow security violations. Faced with this possibility, one way to guarantee information flow security is to design a secure-by-design system that includes hardware mechanisms to proactively prevent all possible insecure information flows. While this approach results in a system that is immune to all possible security violations that an arbitrary application may cause, such stringent security measures may be prohibitively expensive and overly conservative in an IoT system that runs a single, and often simple, application. Also, the hardware mechanisms themselves must always be active, interceding to provide protection even against information flows to which the application is not vulnerable.

Note, (1) it is possible to guarantee information flow security on a commodity processor without the use of restrictive, hardware-based information flow control mechanisms, and (2) it is possible to eliminate information flow security violations in an embedded system simply by making software modifications. However, these possibilities can only be realized with (1) knowledge of the application running in the system, and (2) a means of identifying all possible insecure information flows to which the application is vulnerable.

Based on these insights, an application-specific approach to guaranteeing information flow security for IoT systems is disclosed that identifies all information flow security violations that are possible for a system consisting of a commodity processor and application software and provides software-based techniques that can be used to prevent these information flow security violations.

Disclosed herein is an automated method that takes as input the hardware description (gate-level netlist) of a processor, the software that runs on the system, and labels identifying trusted/untrusted (or secure/insecure) inputs and outputs in the system and efficiently explores all possible application-specific execution states for the system to identify all possible insecure information flows in the system. The output from the disclosed automated method may be used to verify the information flow security of a system as well as to guide and automate software modification to eliminate information flow security vulnerabilities in the system.

FIG. 1 illustrates the process 100 for verifying a security policy using application-specific gate-level information flow tracking. The first step at 102 performs offline input-independent gate-level taint tracking of an entire system binary (indicated at 104) running on a gate-level description of a processor (indicated at 106). The initial components that are tainted are specified by the information flow security policy (indicated at 108) (e.g., ports labeled as untrusted or memory locations labeled as secret). The result of taint tracking is a per-cycle representation of tainted state (both gates and memory bits) (indicated at 110). The second step at 112 performs information flow policy checking where the information flow checks specified by the information flow security policy are verified on the per-cycle tainted state. The result is a list of possible violations of the information flow security policy (indicated at 114).

The pseudocode below describes the input-independent gate-level taint tracking.

Input-independent Gate-level Taint Tracking Pseudocode

1. Procedure Taint Tracking(system_binary, design_netlist, security_policy)
2. Initialize all memory cells and all gates in design_netlist to untainted X
3. Mark tainted ports and gates according to security_policy
4. Load system_binary into program memory
5. Propagate reset signal
6. s ← State at start of system_binary
7. Table of previously observed symbolic states, T.insert(s)
8. Symbolic execution tree, S.set_root(s)
9. Stack of un-processed execution points, U.push(s)
10. mark_all_gates_untoggled(design_netlist)
11. while U != φ ; do
12.     e ← U.pop( )
13.     while e.PC_next != X and !e.END do
14.        e.set_inputs_X( ) // set all peripheral port inputs to Xs
15.        e.set_taints(security_policy) // taint appropriate state according to security_policy
16.        e' ← propagate_gate_values(e) // simulate this cycle
17.        t ← propagate_taint_values(e',e) // determine taint values for e'
18.        S.add_simulation_point(e',t) // store logical and taint state
19.        if e' .modifies_PC then
20.           c ← T.get conservative state(e)
21.           if e' ⊄ c then
22.              T.make_conservative_superstate(c,e')
23.           else
24.              break
25.           end if

| Input-independent Gate-level Taint Tracking Pseudocode |
| --- |
| 26.      end if |
| 27.      e ← e' // advance cycle state |
| 28.    end while |
| 29.    if e.PC_next == X then |
| 30.      c ← T.get_conservative_state(e) |
| 31.      if e ⊄ c then |
| 32.        e' ← T.make_conservative_superstate(c,e) |
| 33.        for all a ∈ possible_PC_next_vals(e') do |
| 34.          e'' ← e.update_PC_next(a) |
| 35.          U.push(e'') |
| 36.        end for |
| 37.      end if |
| 38.    end if |
| 39. end while |

Initially, the values of all memory cells and gates are set as unknown values (i.e., Xs) and are marked as untainted. The system binary, consisting of both tainted and untainted partitions (note that tainted and untainted code partitions do not indicate that the corresponding instructions are marked as tainted or untainted in the program memory, although the tool allows them to be), is loaded into program memory. The tool performs input-independent taint tracking based on symbolic simulation, where each bit of an input is set to an unknown value symbol, X. Additionally, inputs or state elements may be tainted according to the specified information flow security policy (e.g., the non-interference policy described above). Throughout simulation, logical values are propagated throughout the circuit as standard ternary logic. Taint values, which are dependent on both the taint values of inputs and their logical values, are also propagated.

If an X propagates to the program counter (PC), indicating input-dependent control flow, the simulator branches the execution tree and simulates execution for all possible branch paths, following a depth-first ordering of the control flow graph. Since this simulation approach does not scale well for complex or infinite control structures which result in a large number of branches to explore, a conservative approximation is employed that allows the analysis to scale for arbitrarily-complex control structures while conservatively maintaining correctness in exploring possible execution states. The scalable approach works by tracking the most conservative gate-level state that has been observed for each PC-changing instruction (e.g., conditional branch). The most conservative state is the one where the most variables are assumed to be unknown (X). When a branch is re-encountered while simulating on a control flow path, simulation down that path can be terminated if the symbolic state being simulated is a substate of the most conservative state previously observed at the branch (i.e., the states match or the more conservative state has Xs in all differing variables), since the state (or a more conservative version) has already been explored. If the simulated state is not a substate of the most conservative observed state, the two states are merged to create a new conservative symbolic state by replacing differing state variables with Xs, and simulation continues from the conservative state.

Figure 2:
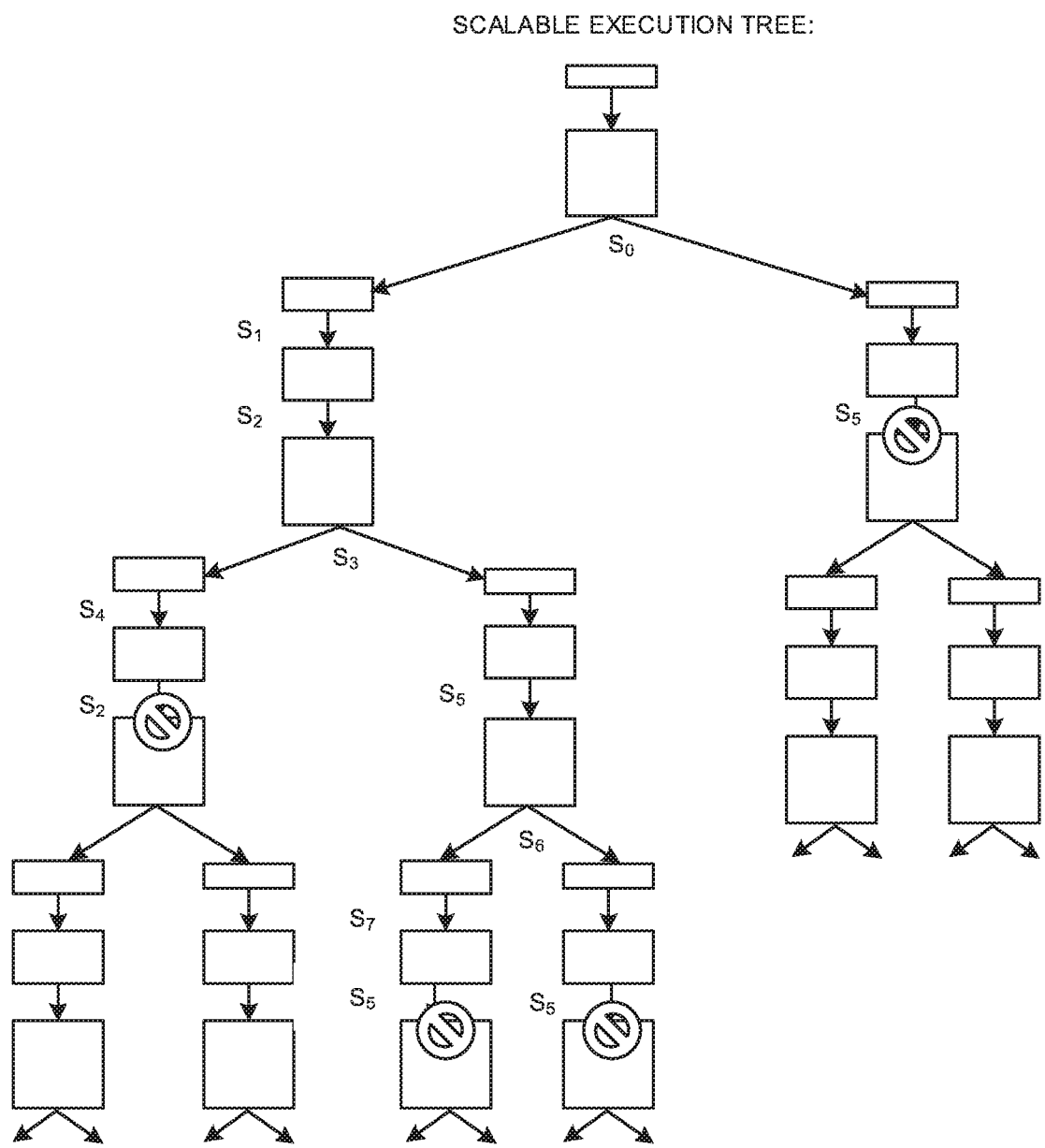
FIG. 2 illustrates one example of an execution tree of an application.

The result of the conservative approximation technique is a pruned execution tree, shown in FIG. 2, which stores both the logical and taint values at each point. Once a state, such as $S_2$ and $S_5$, is observed for a second time, there is no further exploration down that path since all further states have already been considered. This conservative approximation technique allows input-independent gate-level taint tracking to complete in a tractable amount of time, even for applications with an exponentially-large or infinite number of execution paths. (Some complex applications and processors might still require heuristics for exploration of a large number of execution paths; however, the approach is suitable for ultra-low-power systems, representative of an increasing number of future uses which tend to have simple processors and applications. For example, complete analysis of the most complex system takes about 3 hours.)

The result of input-independent gate-level taint tracking is a conservative symbolic execution that represents all possible executions of the entire system's binary. This symbolic execution tree is annotated with logical gate values and associated taint values. Using these taint values, information flow checking can be performed where the specific security policy is checked. An example information flow security policy may be defined by: input and output ports are labeled as trusted or untrusted and, independently, as secret or non-secret (i.e., untrusted and secret are two taints that are analyzed separately). An attacker is assumed to have complete control over all untrusted inputs to the device and controls the initial implementation of untrusted code, which is known at analysis time. No untrusted information can flow out of a trusted port, and no secret information can flow out of a non-secret port.

Figure 3:
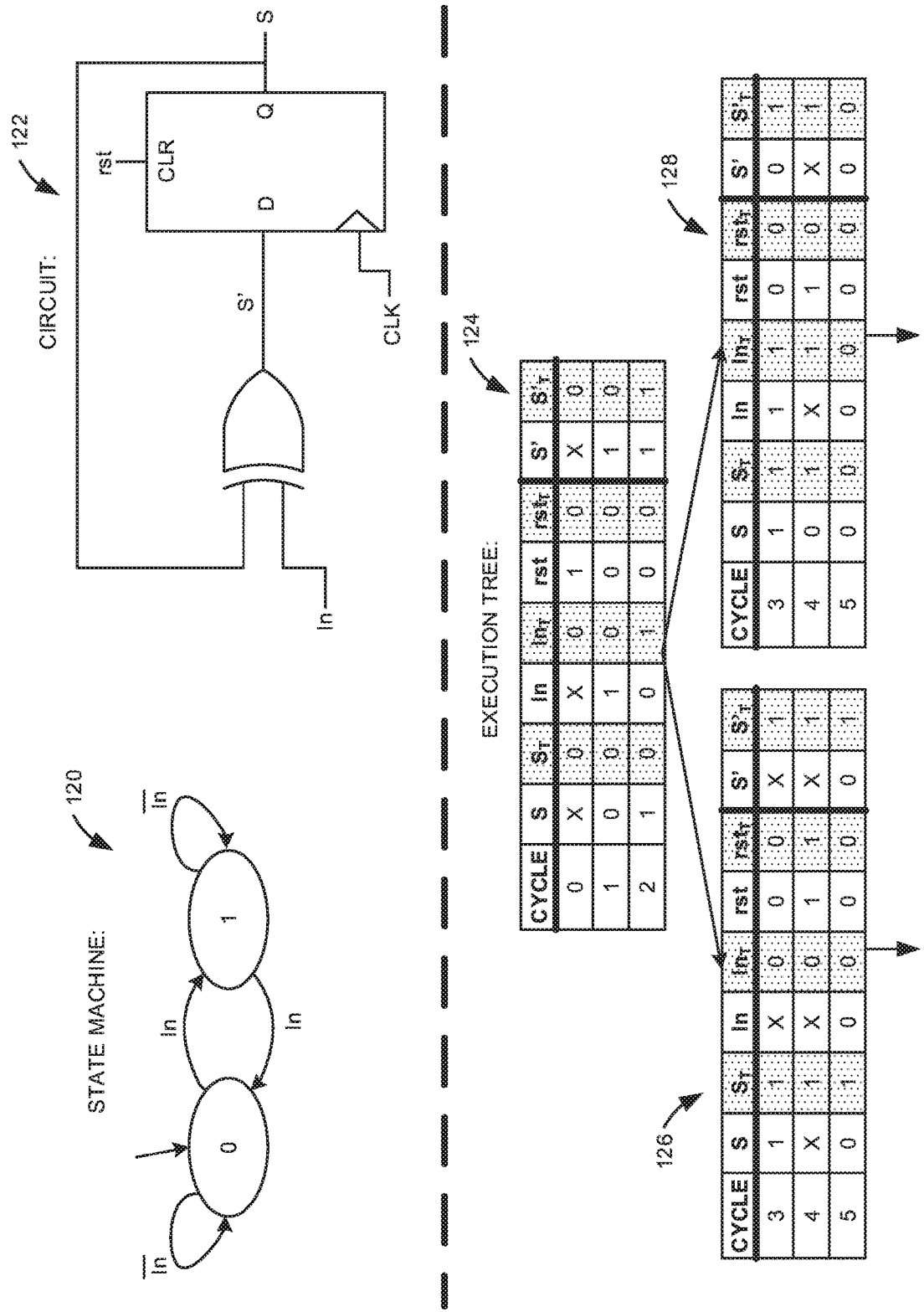
FIG. 3 illustrates one example of the implementation of application-specific gate-level information flow tracking.

FIG. 3 depicts application-specific gate-level information flow tracking on an example portion of a processor circuit. Consider a small portion of a processor represented by the simple state machine 120 and implemented by the circuit 122. During application-specific gate-level information flow tracking of the application binary, the gate-level circuit is symbolically simulated using logical 1s, 0s, and Xs (i.e., unknown value symbols). Along with the values of each gate, a taint value is associated with each gate and is propagated according to the gate type and input values of the gate (taint values are shown with a shaded background). FIG. 3 contains an example (abbreviated) symbolic execution tree 124 that is explored during application-specific gate-level information flow tracking. In cycle 0, the circuit starts out in an unknown, yet untainted state (i.e., both S and In are Xs while $S_T$ and $In_T$ are 0s). As a result of the untainted reset asserted in cycle 0, the circuit enters a known state, S=0. Input In becomes an untainted 1 in cycle 1, resulting in the circuit transitioning to an untainted S=1 state in cycle 2. After cycle 2, the PC (not shown) receives an unknown value and symbolic simulation continues down two paths. Since In was a tainted 0 that propagates through the XOR gate to S', both branches 126 and 128 start in a tainted state S=1. In cycle 3 of branch 126, In is unknown and untainted which, when combined with the tainted state, results in the circuit transitioning into an unknown tainted state, S=X. In cycle 4 of branch 126, a tainted reset is asserted which puts the circuit into a known state, S=0. However, since the reset itself was tainted, the state remains tainted. On branch 128, an untainted reset is asserted in cycle 4. This puts the circuit into a known and untainted state, S=0.

Now that the taint has been tracked throughout every execution of the application, any information flow violations can be detected. The specific conditions that are checked for violations are described below. Conditions that are sufficient for guaranteeing the non-interference information flow security policy described above include:

(1) All processor state elements are untainted before untainted code (i.e., trusted or non-secret code) is executed.

(2) Tainted code does not taint an untainted memory partition used by untainted code.

(3) Untainted code does not load data from a tainted memory partition.

(4) Untainted code does not read from tainted input ports.

(5) Tainted code does not write to untainted output ports.

While the conditions above are not necessary for guaranteeing information flow security, they are sufficient; i.e., a system that maintains the conditions will not leak information. For an information leak of tainted data to occur, tainted data must be accessible to an untainted task in some state or memory element or through a port; a leak occurs when an untainted task propagates accessible tainted data to an untainted output that it has access to, or when a tainted task sends tainted data directly to an untainted output. The conditions above are sufficient to guarantee information flow security because they preclude all possible direct (through a port) or indirect (through state or memory) channels through which tainted information could leak. The first four conditions preclude all possible indirect information flows of tainted data, stating that if an untainted task executes in a taint-free processor, its memory partition remains taint-free, and it does not load tainted data from tainted memory or ports, its computations and outputs will remain untainted. The last condition precludes direct information flows of tainted data, stating that a tainted task is not allowed to write to untainted output ports.

Since the set of conditions above are sufficient, a system that meets the conditions guarantees non-interference. Secure-by-design processors use hardware-based information flow control mechanisms to guarantee that the above conditions are met for all possible applications that execute on the processor. However, none of the conditions above are actually necessary to guarantee non-interference. For example, it is acceptable for state elements to be tainted when an untainted task executes (a violation of condition 1), as long as the computations performed by the task do not depend on any tainted state elements. Similarly, exceptions can be made for all the sufficient conditions (they are not necessary). Thus, as long as the original non-interference property (see above) holds, any or all of the sufficient conditions described above may be relaxed.

Since the symbolic analysis technique for input-independent gate-level taint tracking can check whether the non-interference property holds for all possible executions of a known application without forcing the application to meet the conditions above, it is possible to provide a security guarantee for any application that has no possible violations, even on a commodity processor that is not secure by design. Since symbolic input-independent gate-level taint tracking can identify all possible instances where an application causes the non-interference property to be violated for a system, it can be used to identify locations where an application must be modified to prevent insecure information flows, as well as to verify whether a modified application is secure. Some applications have no possibility of violating one or more of the conditions above. Therefore, some security mechanisms applied by secure-by-design processors represent unnecessary overhead for those applications. On the other hand, if insecure information flows can be eliminated through software modifications, the modifications can specifically target only the insecure information flows to which an application is vulnerable, potentially reducing the overhead of providing security for the system and enhancing programmability (by imposing fewer restrictions on software).

When the sufficient conditions for information flow security described above are not satisfied, it is possible for tainted information to leak. For example, allowing an untainted task to read and operate on tainted data may result in tainting of a processor's control flow state, and subsequently the execution of an untainted task. For example, if a processor's program counter (PC) becomes tainted, then all subsequent instructions will be tainted. Therefore, the control flow of an untainted computational task can also become tainted if it executes after a tainted task that taints the processor's control flow state. In fact, once the PC is tainted by a tainted task, it is possible that control may never become untainted, even if control is returned to untainted code. Preventing information flows from tainted to untainted code must include prevention of all direct information flow (e.g., the tainted code cannot call a yield function to return to untainted execution) and all indirect information flow (i.e., there must exist a mechanism that deterministically bounds the execution time of the tainted code). To avoid information leaks through control flow, there must exist an untaintable, deterministic mechanism that recovers the PC to an untainted state that fetches code from an untainted code partition.

Another common way for information to leak in a commodity processor is through the memory. If code that is allowed to handle tainted information writes to data memory using a fully tainted address, then the entire data memory, including partitions belonging to untainted code, will become tainted. For example, if tainted code reads a value from a tainted input port and then uses the value as an index to write into an array, the tainted address causes the entire data memory to become tainted, not just the memory location pointed to by the address. To avoid such leaks, a mechanism is needed to guarantee that no possible execution of tainted code can write to an untainted data memory partition.

For cases where an application violates the sufficient conditions and is vulnerable to insecure information flows, two software transformations are disclosed, analogous to hardware mechanisms, which target and prevent insecure information flows from happening.

Untainted Timer Reset: An untainted timer can be used to reset the PC to an untainted location after a deterministic execution time of running tainted code, thus guaranteeing that tainted code cannot affect the execution of untainted code. However, on a commodity processor (e.g., openMSP430), generating such a timer is challenging for two reasons. First, common mechanisms for setting the PC, such as interrupts, still depend on the current, possibly tainted state of the pipeline to determine when the PC is reset. Second, the timer must not become tainted. As an example, on the openMSP430, a timer could be directly tainted by tainted code writing to its memory-mapped control register. To overcome these challenges, it is disclosed to use the watchdog timer that is common to many microcontrollers to reset the entire processor after a deterministic-length period of tainted execution. The symbolic simulation-based analysis is used to guarantee that the watchdog remains untainted.

Figure 4:
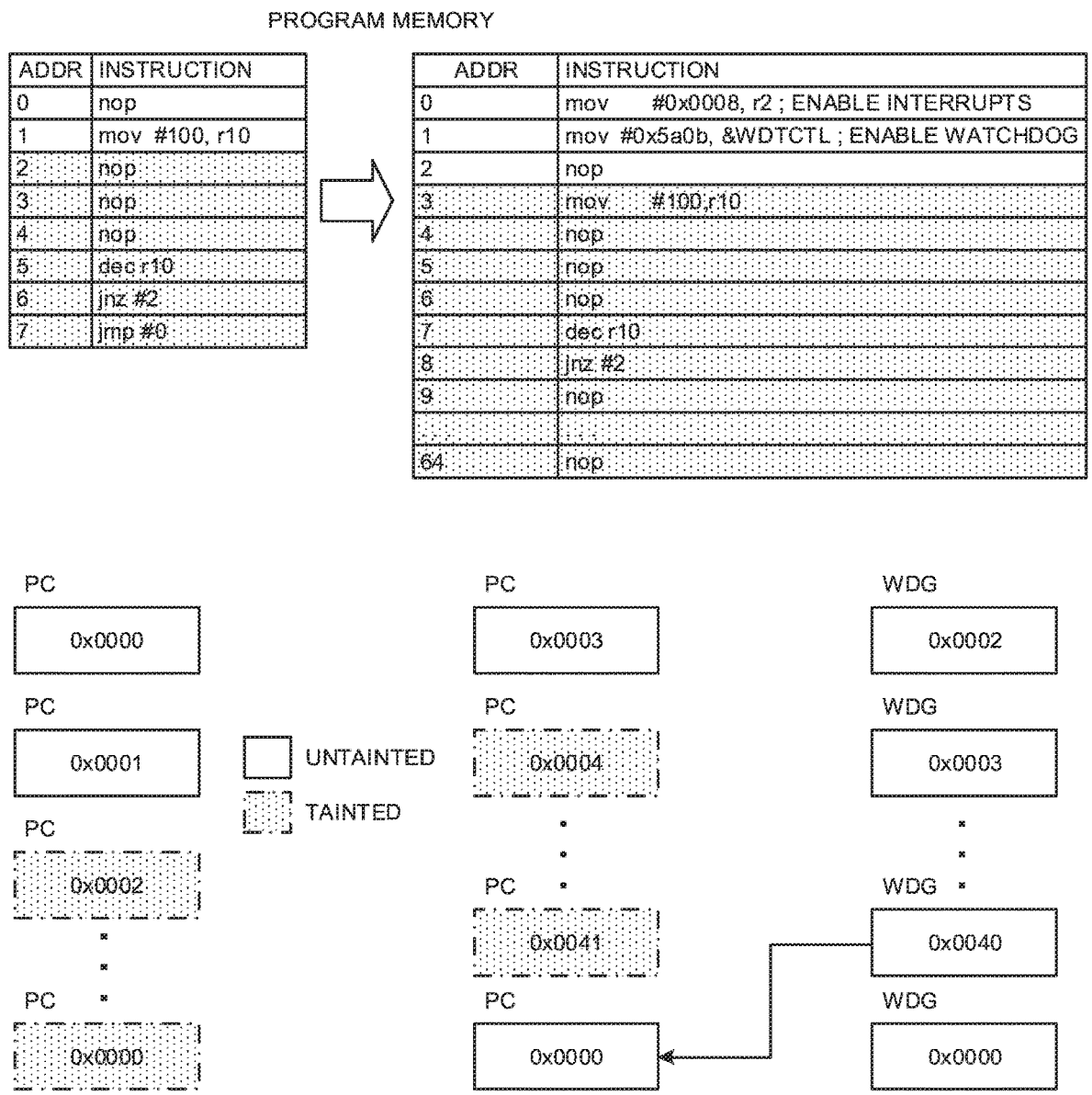
FIG. 4 illustrates one example of an untainted watchdog timer reset.

FIG. 4 illustrates one example of a watchdog timer reset. During the execution of a context switch in an untainted system code partition, the watchdog timer is set to a predetermined value for the computational task that is being switched in. The untainted system code then transfers execution to the tainted computational task. This tainted task can make full use of the processor, except writing to the watchdog or an untainted memory space partition or port, possibly propagating taints throughout the pipeline. When the untainted watchdog expires, it resets the entire pipeline with a power-on reset (POR). (It is assumed that the POR does not reset memory. This is a reasonable assumption, since many microcontrollers have non-volatile memory.) Since this reset is untainted, the state within the pipeline will be reset to untainted values, including the PC.

While using the watchdog timer flushes tainted data from the processor, the subsequent reset state is only untainted if the watchdog timer itself remains untainted. Since applications are known during analysis, the symbolic simulation used during input-independent gate-level taint tracking allows the identification of whether or not any tainted code can write to the control register of the watchdog timer during any possible execution of the tainted code. If there is no possibility of tainted code writing to the control register of the watchdog timer, the write enable input for the control register is verified to be untainted. The only information this can leak is the fact that the tainted code does not access the watchdog timer—a known requirement for guaranteeing information flow security using the approach.

Note that this mechanism works naturally in multi-programming and task switching environments that are common in realtime embedded systems. Before context switching to a tainted computational task, the untainted system code simply sets the watchdog timer to the appropriate interval for the task—either the maximum length of the task or the length of an OS time slice, depending on the usage scenario. Expiration of the timer resets the processor to an untainted state, as usual, which also resets the PC. The code at PC=0 either contains or vectors to the system routine for switching in the next context.

If a tainted computational task wants to use the watchdog timer, it may not be possible to certify the system as secure unless a) it is impossible for the tainted task to cause a control flow violation or b) an alternative, functionally-equivalent (or otherwise acceptable) option can be used in place of the watchdog timer. Microprocessors typically provide several hardware timers, and it may be possible to emulate the functionality desired by the tainted task using a different timer. If it is not possible to use another available timer, software optimizations such as prediction may be used to eliminate the possibility of control flow violations.

Figure 5:
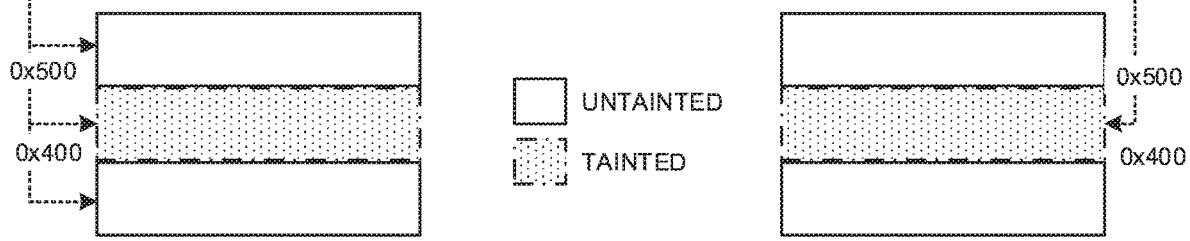
FIG. 5 illustrates one example of a memory mask.

Software Masked Addressing: FIG. 5 illustrates one example of memory bounds masking. The left side shows the original assembly code where a tainted address is used to store data, tainting the entire data memory. On the right side, the assembly code is modified to mask the memory address to guarantee that it falls within the region of data memory to which tainted code is allowed to write. Input-independent taint tracking can then verify that no taint is propagated to memory regions that are untainted. While simple masking solves the memory address taint problem for the case where the PC remains untainted, masking alone cannot guarantee information flow security when the PC becomes tainted. In this case, the tainted PC taints the masking instructions themselves. However, during application-specific gate-level information flow tracking, the program, including the added masking instructions, is known. In this case, the information flow tracking analysis can verify that no possible execution of the tainted code can generate an address outside of the regions of data memory that are allowed to be tainted. If there is no possibility of being able to write outside of allowed memory regions, there is no possibility of information flow, either explicit or implicit, between the allowed and disallowed memory regions. The only information flow that can leak is the information that the tainted application does not write outside of its allowed memory region—a known condition for guaranteeing information flow security.

Consider the left-hand code listing in FIG. 4. The input-independent gate-level taint tracking is initialized such that the shaded instructions are tainted. During any possible execution of the application, once the PC becomes tainted, it never becomes untainted again. However, if the watchdog timer is set using untainted code (see the right-hand code listing in FIG. 4), each execution of the untainted code section has a trusted PC. Now consider the right-hand code listing in FIG. 5. Here, the code itself is not marked as tainted, but the code reads data from a tainted port and uses it to index into an array. During input-independent taint tracking, each input that is read from the tainted port is tainted. It is noted that during information flow tracking that the entire memory space becomes tainted, due to the propagation of tainted data to a memory address calculation. When instructions are inserted that guarantee that the unknown address is bounded to the tainted task's region in data memory, then the result of information flow tracking indicates that no untainted memory locations can be tainted.

Figure 6:
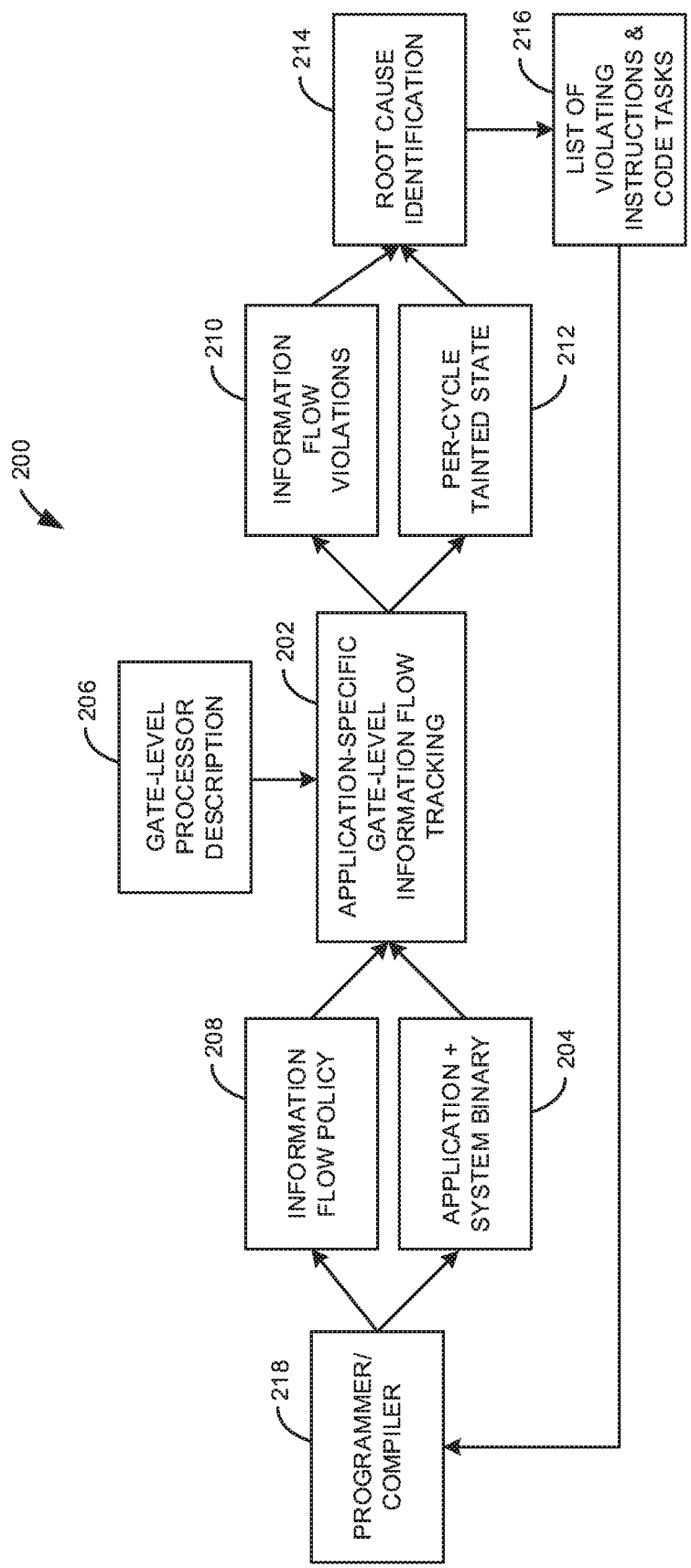
FIG. 6 is a flow diagram illustrating one example of a software refactoring tool flow.

One example of an end-to-end toolflow 200 is illustrated in FIG. 6, for developing systems that guarantee information flow security on commodity processors. The first stage at 202 in the toolflow takes as input application software (indicated at 204), including application code, library code, and system code, as well as the gate-level description of the processor (indicated at 206), and performs application-specific gate-level information flow tracking (described above) on the system for a developer-defined information flow security policy (indicated at 208) that provides tainted/untainted labels for hardware and software (e.g., ports, code partitions, data partitions). The output of information flow tracking is a list of all possible information flow violations (indicated at 210) that may be generated by the application, along with cycle-accurate tainted state (indicated at 212) for each type of information flow.

To guarantee information flow security for the system, all identified violations must be eliminated by modifying the application software. To this end, the next stage 214 of the toolflow identifies the root cause of each violation—i.e., the instructions that lead to violations (indicated at 216). For violations where the PC becomes tainted during execution of a tainted code partition, the root cause identification tool marks the tainted partition as having tainted control flow, requiring the watchdog mechanism to be invoked. In cases where a store instruction in a tainted program partition can potentially write to an untainted memory partition, the static instruction (identified by its address in the program memory) is marked as needing masking.

Necessary software modifications identified by root cause analysis can be applied either manually or automatically by the compiler (indicated at 218). (Two specific cases require programmer attention. First, if an untainted task directly accesses a tainted memory location or input port or a tainted task directly accesses an untainted output port, there is a fundamental violation in the software. In this case, an error is reported and the programmer must either change the software to eliminate the illegal access or redefine the information flow security labels. Second, if a tainted task originally uses the watchdog and also requires the watchdog for information flow guarantees, the programmer must either avoid using the watchdog or refactor the program to avoid tainting control flow.) For each instance where the compiler applies a modification to the software to eliminate a possible insecure information flow, it also reports a compile error or warning (depending on the severity of the violation) to the developer, indicating the line of code that caused the violation and the change that was made to fix the violation. Errors are reported for direct information leaks of tainted data that are not allowed (e.g., tainted code writes to an untainted output port), and warnings are reported for violations that may indirectly lead to information leaks if not fixed (e.g., a store from tainted code can write to an untainted memory partition). Reviewing the list of compile errors and warnings can be informative, since some violations and fixes are unavoidable (e.g., tainted control flow resulting from a control instruction that depends on a tainted input, which is fixed using the watchdog timer), while other violations may be caused by unintended software bugs (e.g., a store that is vulnerable to buffer overflow, which is fixed by masking). In the case of unintended software bugs, changing the program code may avoid the need for automated software modification to eliminate violations (e.g., fixing the buffer overflow problem avoids the need to mask the store).

After software has been modified to eliminate all possible information leaks of tainted data, application-specific gate-level information flow tracking can be used to verify that it is now impossible for the system to violate the specified information flow policy, i.e., the system now guarantees information flow security.

The feedback provided by the toolflow potentially represents another benefit of application-specific information flow tracking over secure-by-design processors. The toolflow identifies and reports all possible causes of insecure information flows. Thus, security vulnerabilities are brought to the developer's attention and can be addressed appropriately, resulting in an application that is secure. In a secure-by-design processor, hardware mechanisms are used to alter the functionality of the application silently, so an application's security vulnerabilities may never be remedied, or even known. Also, violations corrected silently in hardware may manifest as runtime errors. For example, address masking performed by hardware can fix a buffer overflow problem, but the result may be to map the store to some erroneous location inside the buffer, resulting in an erroneous execution/output for the application.

More complex processors contain more performance-enhancing features such as caches, prediction or speculation mechanisms, and out-of-order execution, which introduce non-determinism into the instruction stream. Symbolic co-analysis is capable of handling this added non-determinism at the expense of analysis tool runtime. For example, by injecting an X as the result of a tag check, both the cache hit and miss paths will be explored in the memory hierarchy. Similarly, since co-analysis already explores taken and not-taken paths for input-dependent branches, it can be adapted to handle branch prediction. In an out-of-order processor, instruction ordering is based on the dependence pattern between instructions. While instructions may execute in different orders depending on the state of pipelines and schedulers, a processor that starts from a known reset state and executes the same piece of code will transition through the same sequence of states each time. Thus, modifying input-independent CFG exploration to perform input-independent exploration of the data flow graph (DFG) may allow analysis to be extended to out-of-order execution.

For complex applications, CFG complexity increases. This may not be an issue for simple in-order processors (e.g., the ultra-low-power processors described here), since the number of possible execution states that must be evaluated is naturally limited based on the number of instructions that can be resident in the processor pipeline at once. However, for complex applications running on complex processors, heuristic techniques may be used to improve scalability.

In a multi-programmed setting (including systems that support dynamic linking), the union of all application code (e.g., caller, callee, and the relevant OS code in case of dynamic linking) to identify all possible execution states is considered. Similarly, for self-modifying code, the set of exercisable states is determined considering all code versions. In case of fine-grained execution, any state that is not maintained as part of a thread's context is assumed to have a value of X when symbolic execution is performed for an instruction belonging to the thread. This leads to a conservative coverage of execution states for the thread, irrespective of the behavior of the other threads.

Figure 7:
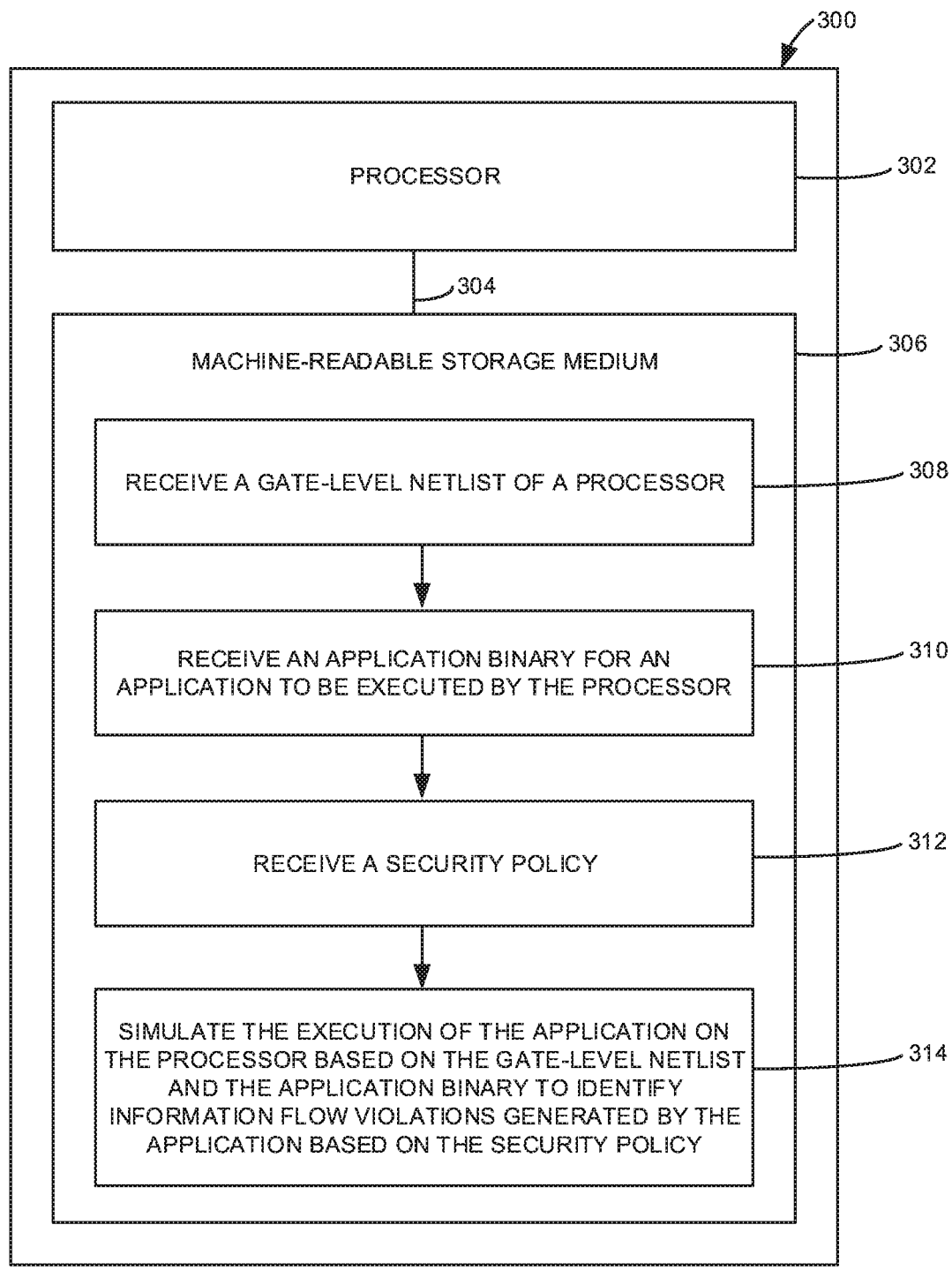
FIG. 7 is a block diagram illustrating one example of a processing system to perform application-specific gate-level information flow tracking.

FIG. 7 is a block diagram illustrating one example of a processing system 300 to perform application-specific gate-level information flow tracking. System 300 includes a processor 302 and a machine-readable storage medium 306. Processor 302 is communicatively coupled to machine-readable storage medium 306 through a communication path 304. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 302 includes one (i.e., a single) central processing unit (CPU) or microprocessor or more than one (i.e., multiple) CPU or microprocessor, and/or other suitable hardware devices for retrieval and execution of instructions stored in machine-readable storage medium 306. Processor 302 may fetch, decode, and execute instructions 308-314 to perform application-specific gate-level information flow tracking.

Processor 302 may fetch, decode, and execute instructions 308 to receive a gate-level netlist of a processor. Processor 302 may fetch, decode, and execute instructions 310 to receive an application binary for an application to be executed by the processor. Processor 302 may fetch, decode, and execute instructions 312 to receive a security policy. Processor 302 may fetch, decode, and execute instructions 314 to simulate the execution of the application on the processor based on the gate-level netlist and the application binary to identify information flow violations generated by the application based on the security policy.

Processor 302 may fetch, decode, and execute further instructions to simulate the execution of the application on the processor to perform symbolic simulation to identify the information flow violations. Processor 302 may execute the instructions to perform the symbolic simulation to: initialize each gate of the gate-level netlist to an untainted X, wherein each X represents an unknown logic value; mark tainted ports and gates of the gate-level netlist based on the security policy; and simulate the application based on the marked gate-level netlist and the application binary to track taint.

Processor 302 may also execute the instructions to perform symbolic simulation to further: track the most conservative gate-level state that has been observed for each conditional branch encountered during the simulation; and in response to re-encountering a conditional branch while simulating on a control flow path: terminate simulation down the control flow path in response to the symbolic state being simulated being a substate of the most conservative gate-level state previously observed at the conditional branch; and in response to the symbolic state being simulated not being a substate of the most conservative gate-level state previously observed at the conditional branch, merge the symbolic state being simulated with the most conservative gate-level state previously observed at the conditional branch to create an updated most conservative gate-level state for the conditional branch, and continue simulation from the updated most conservative gate-level state.

Processor 302 may fetch, decode, and execute further instructions to modify the application to prevent the identified information flow violations. Processor 302 may execute the instructions to modify the application to add a watchdog timer to reset a program counter to an untainted location. Processor 302 may execute the instructions to modify the application to mask a tainted memory address such that the memory address falls within a region of data memory to which tainted code is allowed to write.

As an alternative or in addition to retrieving and executing instructions, processor 302 may include one (i.e., a single) electronic circuit or more than one (i.e., multiple) electronic circuit comprising a number of electronic components for performing the functionality of one of the instructions or more than one of the instructions in machine-readable storage medium 306. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 306 is a non-transitory storage medium and may be any suitable electronic, magnetic, optical, or other physical storage device that stores executable instructions. Thus, machine-readable storage medium 306 may be, for example, random access memory (RAM), an electrically-erasable programmable read-only memory (EEPROM), a storage drive, an optical disc, and the like. Machine-readable storage medium 306 may be disposed within system 300, as illustrated in FIG. 7. In this case, the executable instructions may be installed on system 300. Alternatively, machine-readable storage medium 306 may be a portable, external, or remote storage medium that allows system 300 to download the instructions from the portable/external/remote storage medium. In this case, the executable instructions may be part of an installation package.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein.

The invention claimed is:

1. A method comprising:
receiving, via a processing system, a hardware design of a not secure-by-design processor;
receiving, via the processing system, a specific software application to be executed by the not secure-by-design processor;
receiving, via the processing system, a security policy;
simulating, via the processing system, the execution of the specific software application on the not secure-by-design processor for all possible executions of the specific software application for any possible inputs to the specific software application by performing symbolic simulation to identify all possible information flows and to identify information flow violations generated by the specific software application based on the security policy; and
modifying the specific software application to prevent the identified information flow violations without the use of hardware-based information flow control mechanisms to prevent the identified information flow violations for all possible executions of the specific software application by the not secure-by-design processor,
wherein performing the symbolic simulation comprises:
initializing each gate of a gate-level netlist of the not secure-by-design processor design to an untainted X, wherein each X represents an unknown logic value;
marking tainted ports and gates of the gate-level netlist based on the security policy;
simulating the specific software application based on the marked gate-level netlist and an application binary to track taint;
tracking the most conservative gate-level state that has been observed for each conditional branch encountered during the simulation; and
in response to re-encountering a conditional branch while simulating on a control flow path:
terminating simulation down the control flow path in response to the symbolic state being simulated being a substate of the most conservative gate-level state previously observed at the conditional branch; and
in response to the symbolic state being simulated not being a substate of the most conservative gate-level state previously observed at the conditional branch, merging the symbolic state being simulated with the most conservative gate-level state previously observed at the conditional branch to update the most conservative gate-level state for the conditional branch, and continuing simulation from the updated most conservative gate-level state.

2. The method of claim 1, wherein modifying the specific software application comprises adding a timer to reset a program counter to an untainted location.

3. The method of claim 1, wherein modifying the specific software application comprises masking a tainted memory address such that the memory address falls within a region of data memory to which tainted code is allowed to write.

4. The method of claim 1, wherein the not secure-by-design processor comprises an ultra-low-power processor.

5. The method of claim 1, wherein the specific software application comprise an Internet of Things (IoT) application.

6. A system comprising:
a machine readable storage medium storing instructions; and
a simulation processor to execute the instructions to:
receive a gate-level netlist of a not secure-by-design processor;
receive an application binary for a specific software application to be executed by the not secure-by-design processor;
receive a security policy;
simulate the execution of the specific software application on the not secure-by-design processor based on the gate-level netlist and the application binary for all possible executions of the specific software application for any possible inputs to the specific software application by performing symbolic simulation to identify all possible information flows and to identify information flow violations generated by the specific software application based on the security policy; and
modify the specific software application to prevent the identified information flow violations without the use of hardware-based information flow control mechanisms to prevent the identified information flow violations for all possible executions of the specific software application by the not secure-by-design processor, wherein the simulation processor executes the instructions to perform the symbolic simulation to:

initialize each gate of the gate-level netlist to an untainted X, wherein each X represents an unknown logic value;

mark tainted ports and gates of the gate-level netlist based on the security policy;

simulate the specific software application based on the marked gate-level netlist and the application binary to track taint;

track the most conservative gate-level state that has been observed for each conditional branch encountered during the simulation; and in response to re-encountering a conditional branch while simulating on a control flow path:

terminate simulation down the control flow path in response to the symbolic state being simulated being a substate of the most conservative gate-level state previously observed at the conditional branch; and in response to the symbolic state being simulated not being a substate of the most conservative gate-level state previously observed at the conditional branch, merge the symbolic state being simulated with the most conservative gate-level state previously observed at the conditional branch to create an updated most conservative gate-level state for the conditional branch, and continue simulation from the updated most conservative gate-level state.

7. The system of claim 6, wherein the simulation processor executes the instructions to modify the specific software application to:

add a watchdog timer to reset a program counter to an untainted location.

8. The system of claim 6, wherein the simulation processor executes the instructions to modify the specific software application to:

mask a tainted memory address such that the memory address falls within a region of data memory to which tainted code is allowed to write.

9. A method comprising:

receiving, via a processing system, a gate-level netlist of a not secure-by-design processor, a specific software application to be executed by the not secure-by-design processor, and a security policy;

initializing, via the processing system, each gate of the gate-level netlist to an untainted X, wherein each X represents an unknown logic value;

marking, via the processing system, tainted ports and gates of the gate-level netlist based on the security policy;

simulating, via the processing system, the specific software application based on the marked gate-level netlist to track taint for all possible executions of the specific software application for any possible inputs to the specific software application by performing symbolic simulation;

identifying information flow violations based on the tracked taint and the security policy; and modifying the specific software application to prevent the identified information flow violations without the use of hardware-based information flow control mechanisms to prevent the identified information flow violations for all possible executions of the specific software application by the not secure-by-design processor, wherein the simulating further comprises:

tracking, via the processing system, the most conservative gate-level state that has been observed for each conditional branch encountered during the simulation; and in response to re-encountering a conditional branch while simulating on a control flow path:

terminating, via the processing system, simulation down the control flow path in response to the symbolic state being simulated being a substate of the most conservative gate-level state previously observed at the conditional branch; and in response to the symbolic state being simulated not being a substate of the most conservative gate-level state previously observed at the conditional branch, merging, via the processing system, the symbolic state being simulated with the most conservative gate-level state previously observed at the conditional branch to create an updated most conservative gate-level state for the conditional branch, and continuing simulation from the updated most conservative gate-level state.

10. The method of claim 9, wherein the not secure-by-design processor comprises an ultra-low-power processor.

* * * * *